(12) United States Patent
Choi et al.

(10) Patent No.: US 10,852,872 B2
(45) Date of Patent: Dec. 1, 2020

(54) GRABITY: A VIRTUAL REALITY HAPTIC CONTROLLER FOR CREATING GRAVITY AND STIFFNESS DURING GRASPING MOTIONS THROUGH ASYMMETRIC VIBRATIONS

(71) Applicant: The Board of Trustees of the Leland Stanford Junior University, Stanford, CA (US)

(72) Inventors: Inrak Choi, Stanford, CA (US); Sean Follmer, Palo Alto, CA (US); Heather Culbertson, Los Angeles, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 232 days.

(21) Appl. No.: 16/158,589

(22) Filed: Oct. 12, 2018

(65) Prior Publication Data
US 2019/0114017 A1  Apr. 18, 2019

Related U.S. Application Data

(60) Provisional application No. 62/571,745, filed on Oct. 12, 2017.

(51) Int. Cl.
*G06F 3/041* (2006.01)
*G06F 3/01* (2006.01)
(Continued)

(52) U.S. Cl.
CPC ............ *G06F 3/0414* (2013.01); *G06F 3/011* (2013.01); *G06F 3/014* (2013.01); *G06F 3/016* (2013.01);
(Continued)

(58) Field of Classification Search
CPC ....................................................... G06F 3/011
See application file for complete search history.

(56) References Cited

U.S. PATENT DOCUMENTS

| 7,919,945 B2 | 4/2011 | Houston |
| 8,981,682 B2 | 3/2015 | Delson |
| 2015/0081110 A1 | 3/2015 | Houston |

FOREIGN PATENT DOCUMENTS

EP       2422939       2/2012

OTHER PUBLICATIONS

Culbertson et al. Modeling and Design of Asymmetric Vibrations to Induce Ungrounded Pulling Sensation Through Asymmetric Skin Displacement. In Haptics Symposium (HAPTICS), 2016 IEEE. IEEE, 27-33.

(Continued)

*Primary Examiner* — Gustavo Polo
(74) *Attorney, Agent, or Firm* — Lumen Patent Firm

(57) ABSTRACT

A device to simulate kinesthetic pad opposition grip forces and weight for grasping virtual objects in a virtual reality is provided. The device includes a base, a sliding part, a braking mechanism and a swinging part with linear resonant actuators (e.g. voice coil actuators). The sliding part is connected with the base through a first prismatic joint which allows for single degree of freedom pinching motions for grasping an object. The swinging part connected to the sliding part and the base through revolute joints. The brake mechanism is used to create a grasping force. The linear resonant actuators provide both touch sensation at initial contact and sensation of weight when lifting the object.

8 Claims, 5 Drawing Sheets

(51) Int. Cl.
*G06T 19/00* (2011.01)
*G06F 3/0354* (2013.01)
*G06F 3/0484* (2013.01)

(52) U.S. Cl.
CPC ...... *G06F 3/03547* (2013.01); *G06F 3/04842* (2013.01); *G06T 19/006* (2013.01)

(56) References Cited

OTHER PUBLICATIONS

Barbagli et al. 2004. Toward virtual manipulation: from one point of contact to four. Sensor Review 24, 1 (2004), 51-59.
Amemiya etal. 2014. Distinct pseudo-attraction force sensation by a thumb-sized vibrator that oscillates asymmetrically. Int, Conf. Human Haptic Sensing and Touch Enabled Computer Applications. Springer, 88-95.
Najdovski et al. 2008. Extending haptic device capability for 3D virtual grasping. Haptics: perception, devices and scenarios (2008), 494-503.
Rekimoto 2014. Traxion: a tactile interaction device with virtual force sensation. In ACM SIGGRAPH 2014 Emerging Technologies. ACM, 25.

GRABITY: A VIRTUAL REALITY HAPTIC CONTROLLER FOR CREATING GRAVITY AND STIFFNESS DURING GRASPING MOTIONS THROUGH ASYMMETRIC VIBRATIONS

CROSS-REFERENCE TO RELATED APPLICATIONS

This application claims priority from U.S. Provisional Patent Application 62/571,745 filed Oct. 12, 2017, which is incorporated herein by reference.

FIELD OF THE INVENTION

This invention relates to virtual reality haptic devices, systems and methods.

BACKGROUND OF THE INVENTION

To grasp and manipulate objects in the real world, humans rely on haptic cues such as fingertip contact pressure and kinesthetic feedback of finger positions to determine shape, and proprioceptive and cutaneous feedback for weight perception, among other modalities. Current virtual reality (VR) systems can render realistic 3D objects visually, but most lack the ability to provide a realistic haptic experience. To create haptic interfaces that can provide a realistic grasping experience we must support these same modalities and render similar forces to a user's hands. The present invention addresses these needs.

SUMMARY OF THE INVENTION

The present invention provides a device to simulate kinesthetic pad opposition grip forces and weight for grasping virtual objects in a virtual reality. The device includes a base with a thumb pad. The device further includes a sliding part connected with the base through a first prismatic joint. The sliding part has a finger pad. The prismatic joint allows for single degree of freedom pinching motions between the thumb pad and the finger pad for grasping an object. The device further includes a brake mechanism on the sliding part as a first actuator. The brake mechanism is used to create a grasping force. The device also includes a swinging part connected to the sliding part and the base through revolute joints. In one example, the swinging part has two voice coil actuators as second actuators connected through a second prismatic joint. A first voice coil actuator is placed closely to the finger pad and the other voice coil actuator is placed closely to the thumb pad for transmission of vibration signals. The voice coil actuators provide both touch sensation at initial contact and sensation of weight when lifting the object.

Voice coil actuators is used in the exemplary embodiments but could be replaced by a one-dimensional linear actuator such as an oscillating mass on a spring where the position of the mass is controlled by a motor or a voice coil, linear servos, rotary motors with a mechanical linkage to translate rotation to displacement of skin, rotary servo motors with a mechanical linkage to translate rotation to displacement of skin, linear resonant actuators or the like.

For a specific virtual reality application, the base could have retroreflective markers which could be captured by an external optical motion capture system for tracking the thumb's position and orientation.

In some examples, the first and the second prismatic joints are made of carbon fiber tubes, the finger pad is an index finger pad, and the brake mechanism could contain a brake lever, a tendon, and a motor. In some other examples, the offset distance between the revolute joint and center of mass of the swinging part could ensure that the direction of the voice coil actuators is always passively directed to be normal to ground. In yet some other examples, the second prismatic joint on the swinging part could constrain two angles of the voice coil actuators to be the same while allowing them to slide relative to one another.

Embodiments of the invention have advantages in that (i) they provide weight sensations to a mobile haptic device by creating asymmetric vibrations, and (ii) the bearing mechanism reduces the number of voice coil actuators for weight simulation; i.e. by attaching linear resonant actuators (e.g. voice coil actuators) through bearings, the vibrations from the linear resonant actuators are always normal to ground, and this reduces the number of actuators for weight simulation.

DETAILED DESCRIPTION

In this invention, we introduce Grabity, a mobile, ungrounded haptic device, which can display various types of kinesthetic feedback to enhance the grasping and manipulating of virtual objects. This feedback includes gravity, force for inertia, as well as rigid stiffness force feedback between opposing fingers. The design combines a "gripper" style haptic device, for providing opposing forces between the index finger and thumb, and a skin deformation mechanism, for rendering inertia and mass of a virtual object. Asymmetric skin deformation enabled by linear vibratory motors can generate perceived virtual forces tangential to finger pads.

In this invention, we apply this principle to render the virtual gravity force of different virtual masses, and their associated inertia in a 1 degree of freedom per finger. To create the sensation of gravity and inertia, we adapt two voice coil actuators to a mobile gripper type haptic device. We utilize different magnitudes of asymmetric vibrations to generating various levels of force feedback. The gripper element includes a unidirectional brake to create the rigid, high-stiffness, opposing forces between a finger and thumb.

To design a device that can provide feedback for touching, grasping, gravity, and inertia, we chose to combine a gripper type device with cutaneous asymmetric skin stretch. For this device's performance for our scenarios, we emphasize the optimization of the following design parameters:

Weight. The overall mass of the device should be lightweight in order for the skin stretch to be perceived as weight, as the virtual forces have been shown to be low (<30 g) and weight perception acuity decreases as total weight increases.

Motion range. Wide range of motion to grasp and manipulate different sized objects.

Mechanical complexity. Minimize the number of actuators, to reduce cost and weight. In addition, research has yet to show that people can simultaneously integrate multiple directions of asymmetric skin stretch well.

Anatomical alignment. The index finger and thumb should be parallel in alignment to receive consistent directional skins stretch cues. Misalignment can create confusion and unintentional torques.

Stiffness. High stiffness for pad opposition forces. Grip force of the human hand can exceed 100N.

Performance. Accurate and fast position tracking to integrate into VR.

Overall Structure

Figure 1A:
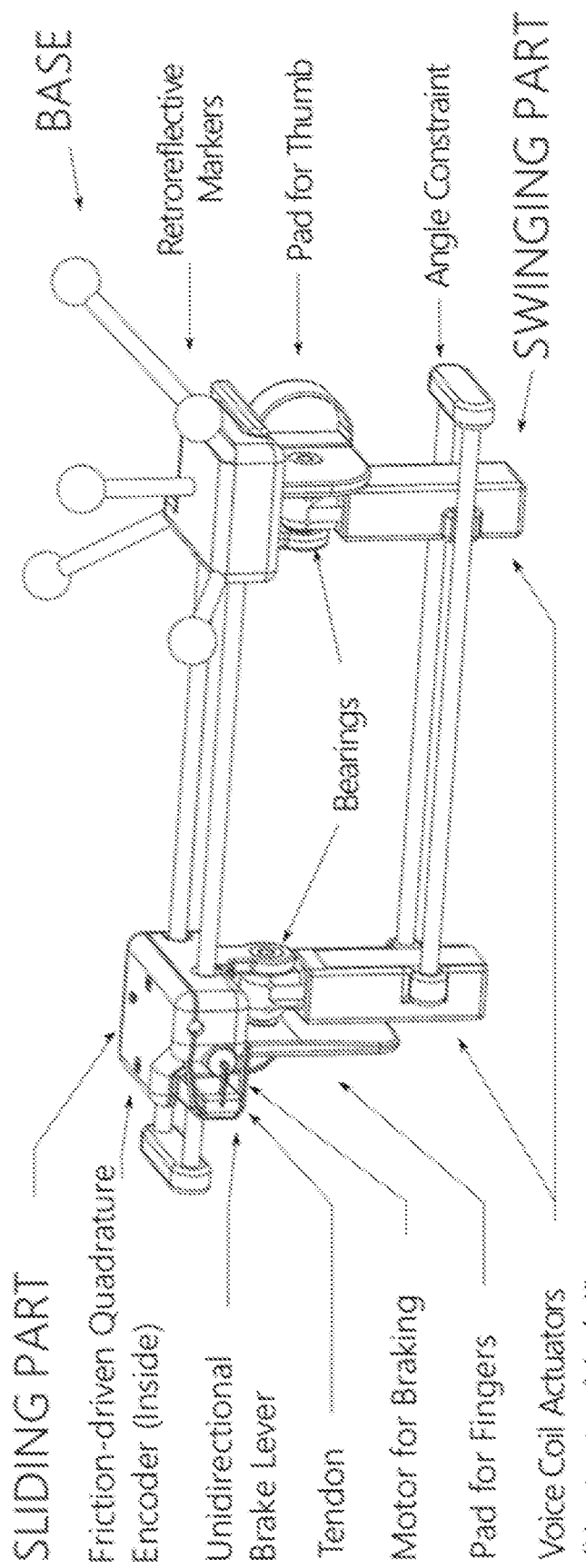
FIGS. 1A-B show according to an exemplary embodiment of the invention a device to simulate kinesthetic pad opposition grip forces and weight for grasping virtual objects in a virtual reality.
Figure 1B:
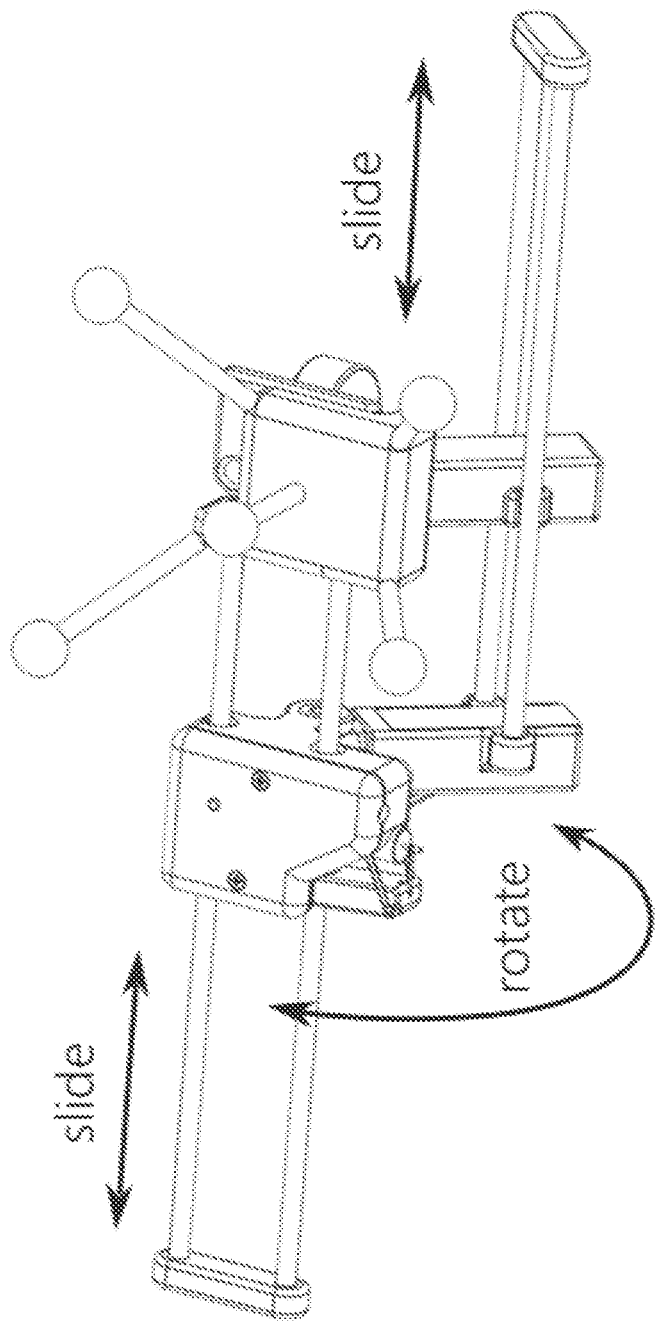

As shown in FIGS. 1A-B, the device distinguishes three rigid bodies: a base, a sliding part, and a swinging part. The base is mounted on the thumb, and it has retroreflective markers for an external optical motion capture system for tracking the thumb's position and orientation. For the purposes of the invention, a global position tracking system is required if one wants to use it for a VR application. In one example, we used retroreflective markers as a passive position tracking system. LEDs could be mounted for an active tracking system, or a software algorithm calculating position and orientation through camera images. However, the position tracking system is not directly related to the weight simulating technology. The sliding part is mounted on the index finger and is connected with the base through a prismatic joint that is composed of two carbon fiber tubes. The sliding part could also be mounted on another finger. This single degree of freedom allows pinching motions for grasping objects. In one example, a brake mechanism on the sliding part contains a brake lever, a tendon, and a motor. However, such specific braking mechanism is not necessary for the implementation of the invention. Any mechanism would be possible if it provides force feedback between the thumb and fingers so that the fingertip skins have solid contact (normal force) with the haptic device. The swinging part, which is connected to the sliding part and base through revolute joints, is has two voice coil actuators (e.g. Haptuator Mark II, Tactile Labs) and a prismatic joint made of carbon fiber tubes. Each voice coil actuator is placed closely to the index finger and thumb pads so that it can transmit the desired vibration signals properly. The offset distance between the revolute joint and center of mass of the swinging part ensures that the direction of the voice coil actuators is always passively directed to be normal to ground. The prismatic joint on the swinging part constrains the two angles of voice coil actuators to be the same while allowing them to slide relative to one another. In this exemplary embodiment, most parts of the device are 3D printed using a Formlabs 2 printer (SLA technology), and the device weighs 65 grams.

Actuation for Force Feedback

Figure 2:
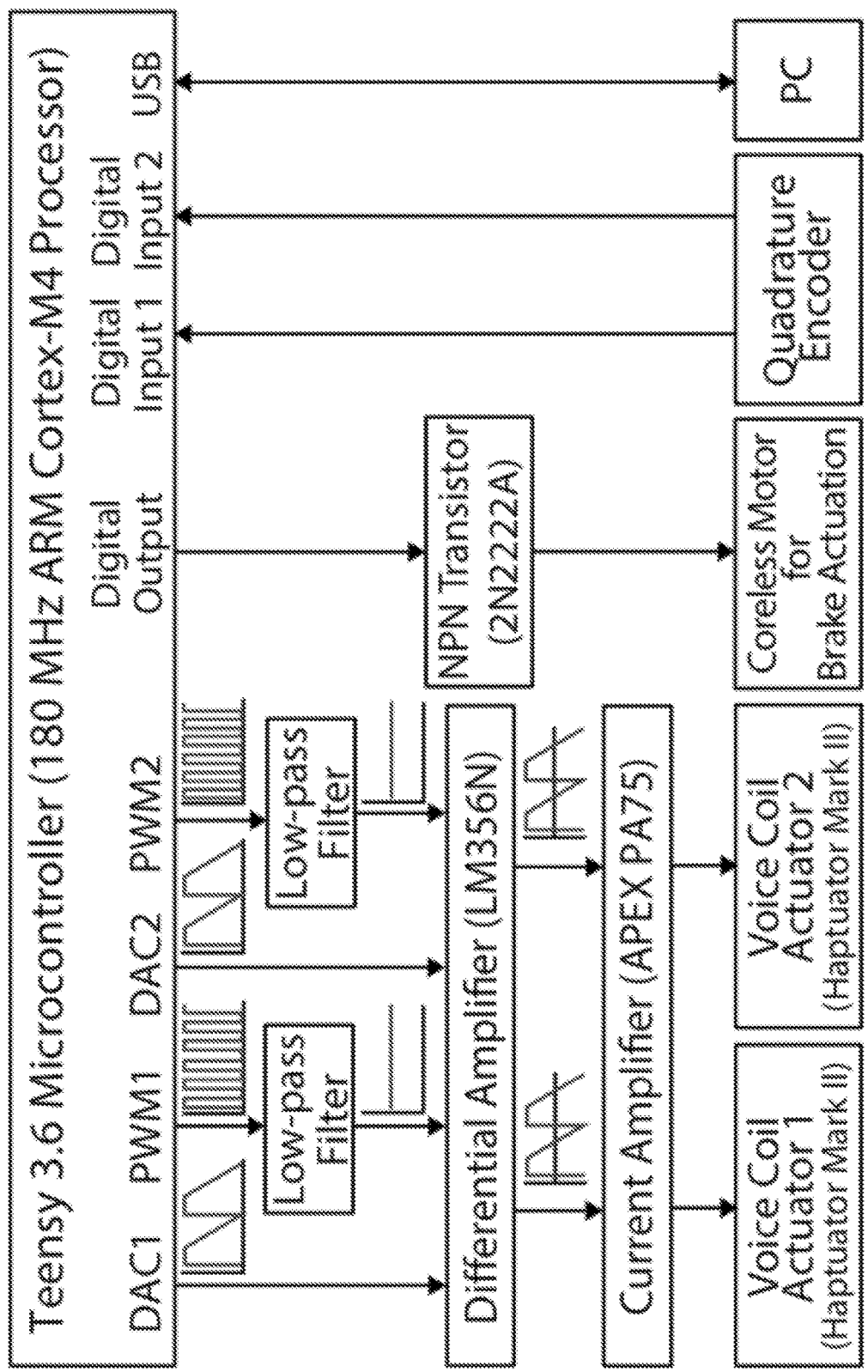
FIG. 2 shows according to an exemplary embodiment of the invention a system diagram for the device shown in FIGS. 1A-B.

The Grabity device contains two types of actuators: a brake mechanism and two voice coil actuators. The brake mechanism is used to create a rigid grasping force, while the voice coil actuators provide both touch sensation at initial contact and the sensation of weight when lifting the object. FIG. 2 shows a system diagram of Grabity.

Touching: Conventional Vibration

When a user touches a virtual object without grasping, the voice coil actuators act like conventional vibrotactile transducers and play simple symmetric vibrations to indicate the point of initial contact. The voice coil actuator on the index finger or the thumb vibrates individually depending on which finger is touching the virtual object.

Grasping: Unidirectional Brake Mechanism

When a user grasps a virtual object, the brake mechanism is activated to create a rigid passive force, which is an adapted unidirectional brake mechanism. In an exemplary embodiment, the brake mechanism provides a locking force using a brake lever, which is activated by a small DC motor (6 mm). Once the brake is engaged, the motor is turned off and the user's own grasping force keeps the brake lever engaged. While the brake is engaged it provides strong resistance that exceeds 100 N in the direction of the two fingers. However, when the user releases their grip, the brake disengages, allowing the user to open her hand. One could use a rubber tendon to move the brake lever back to the original position when releasing a grip, but here we use two magnets (one on the brake lever and the other on the body of the device) to reset the lever, for more consistent and reliable performance.

Weight: Asymmetric Vibration

When a user lifts or shakes a virtual object, the voice coil actuators vibrate asymmetrically to generate the sensation of weight. If the magnet inside the voice coil actuator moves down quickly and moves up slowly, the skin on the user's finger pads is stretched asymmetrically.

Figure 3:
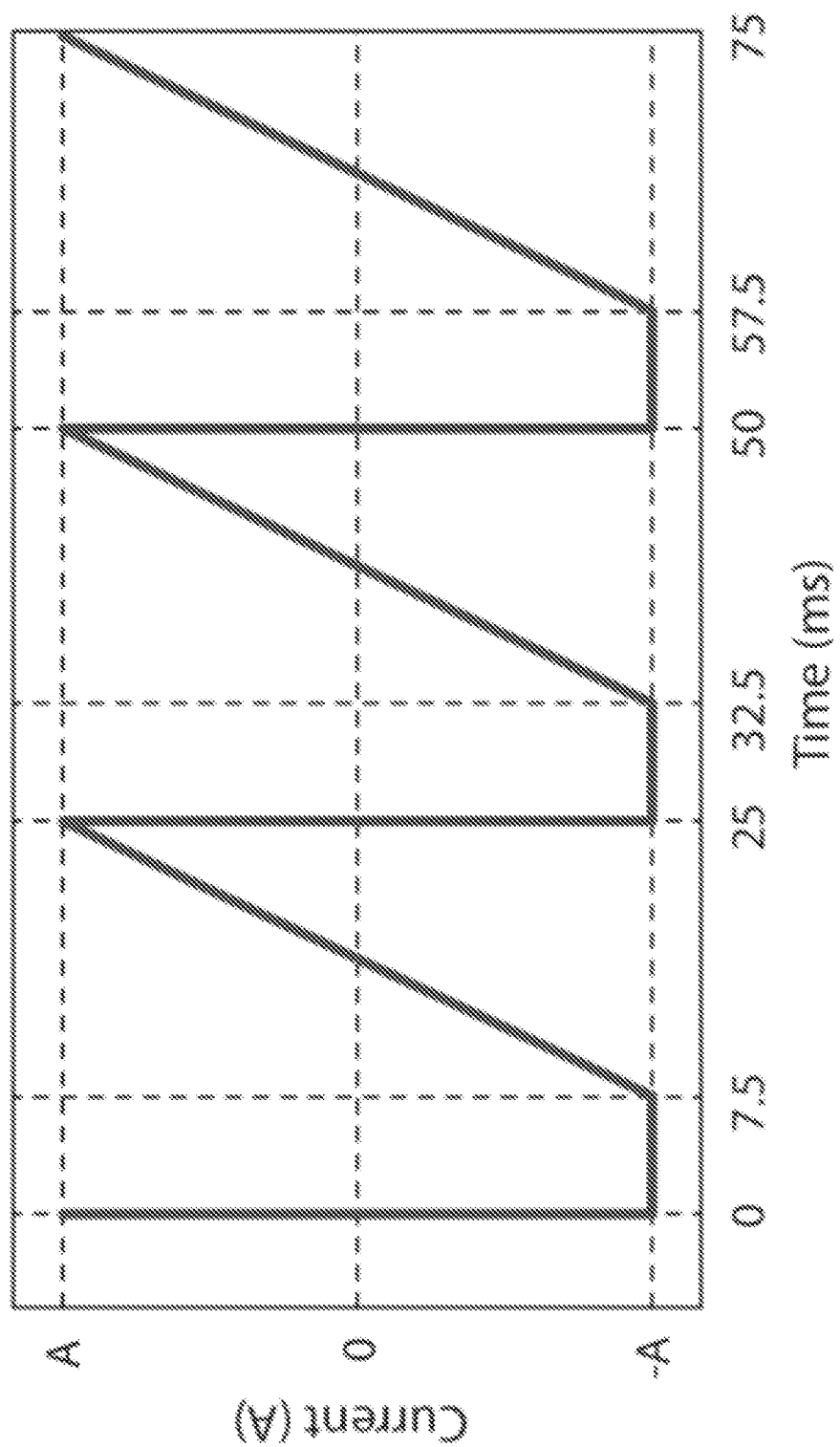
FIG. 3 shows according to an exemplary embodiment of the invention a current signal generating asymmetric vibration. A is amplitude of current.
Figure 4:
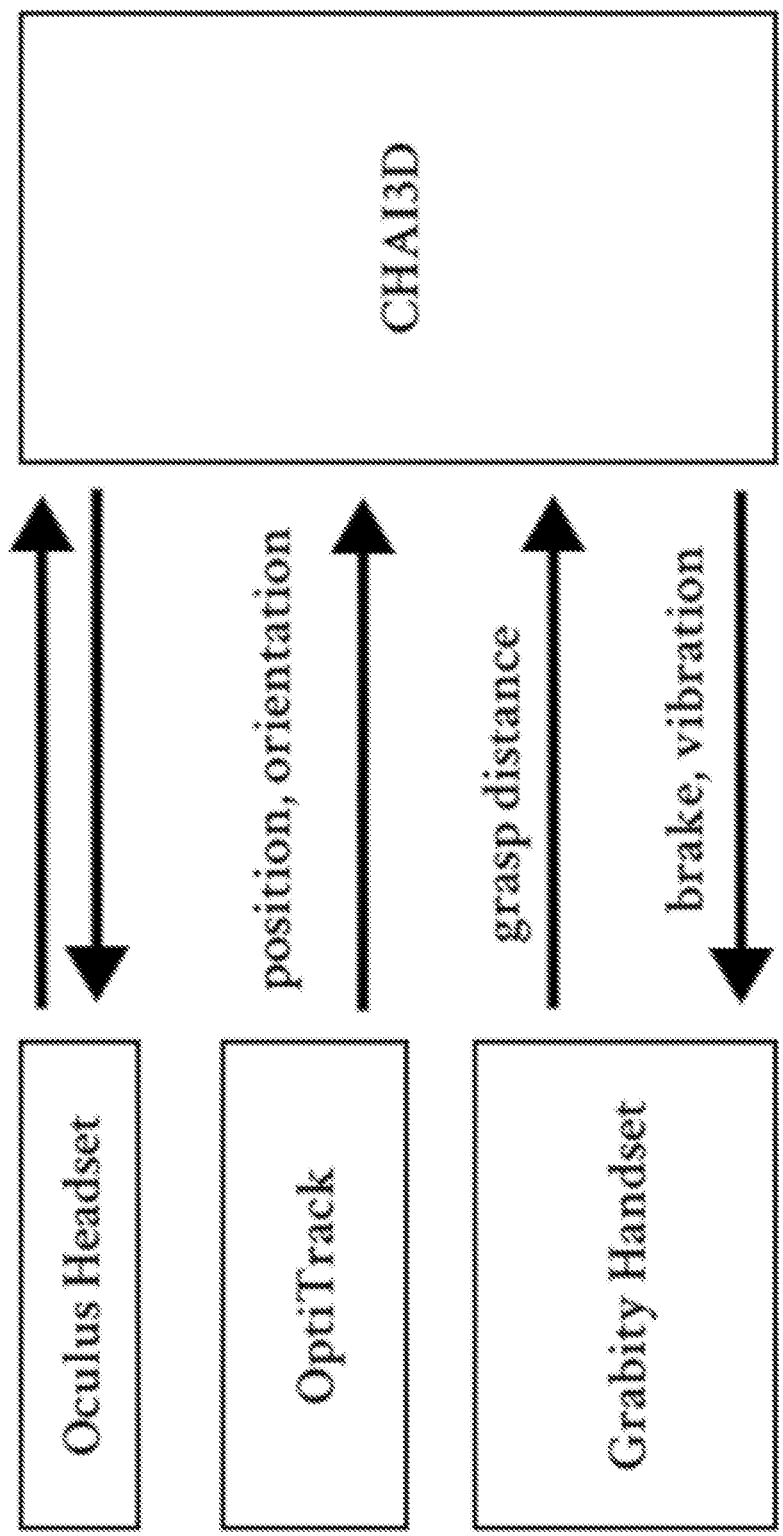
FIG. 4 shows according to an exemplary embodiment of the invention a block diagram of a virtual reality application.

FIG. 3 shows the shape of commanded current pulses. The shape of these current pulses is designed to give the actuators a large step of current initially to cause a large acceleration in the magnet, then to ramp the current back down to slowly return that magnet to its starting position. To achieve this asymmetric actuation, a fast analog signal and current controller are required. Therefore, in this exemplary embodiment we used a Teensy 3.6 microcontroller (ARM Cortex-M4 at 180 Mhz with two DACs) generating 15 kHz analog signal output and a linear current-drive circuit. A current-drive circuit creates less effective damping to the system than a voltage-drive circuit, so it is more suitable for asymmetric vibration control. We chose a drive signal with a 40 Hz frequency (25 ms period) and 0.3 pulse width ratio ($t_1$=7.5 ms and $t_2$=17.5 ms). To simulate various weight sensations, we change the amplitude A of the signal, while keeping the frequency and pulse width ratio fixed.

Sensing

An OptiTrack motion tracking system is used to track the position and orientation of the thumb. A magnetic encoder is attached to the index finger sliding assembly to track it's position relative to the thumb. The encoder is friction driven and rolls on the prismatic joint (carbon fiber tube). Using the data from the motion tracking system and magnetic encoder, we can render user's thumb and index finger in VR.

The resolution of the magnetic encoder and friction drive assembly was measured to be 2 mm of linear travel. This resolution is sufficient based on just noticeable difference (JND) results of fingers to thumb distance perception. The Wolverine system had a Time-of-Flight sensor to measure this distance with a resolution of 1 mm; however, it also had ±1 mm noise with 100 Hz sampling rate. By adapting the magnetic encoder, we can achieve much lower noise and much higher sampling rate (kHz), at the cost of resolution.

Software: Virtual Reality Haptics Framework

The software framework for this exemplary embodiment was implemented in C++ and uses multiple software libraries. As a virtual haptic device, Grabity requires knowledge of its position as input and produces force as output. The information flow begins with position tracking of Grabity with the OptiTrack motion tracking system. The framework gets the 6DOF pose through the Motive C++ API. The grasping distance is transferred over the Teensy's serial link (250,000 bits per second) from the encoder in the Grabity device's slider.

In CHAI3D (version 3.2.0), Grabity is represented as a subclass of the cGenericHapticDevice that accesses both the device position and the grasping distance. CHAI3D integration for Open Dynamics Engine (ODE) renders the physical interactions. The display appears on the Oculus VR headset, and the force output given by ODE is passed along to the cGrabityDevice class. The force is further separated into its components as it is to the Teensy microcontroller.

Mass Simulation During Grasping

CHAI3D provides the output force, torque, and gripper force to the custom haptic device. Because Grabity has only two modes of actuation, these virtual values need to be converted into a voice coil signal and a command to lock the slider. The locking occurs when the gripper force (the force pushing apart the thumb and finger, i.e., from gripping a block) is greater than an empirically determined threshold of 0.7 N. This value was chosen to avoid locking when one finger strikes a block, but trigger locking quickly when a block is grasped.

Determining the voice coil signal is more complex. First, we must assume the voice coil is always pointing downward. This assumption is not always correct, as the coils swing on a limited range and only in one dimension. However, we have found that most hand orientations the subjects use are sufficiently close to this approximation. As such, we use the output force's z-component and ignore the other two.

Second, we must separately extract the downward force for each of the two fingers. This information is encoded in the torque. As previously, we approximate the voice coil directions as downward. We thus project the finger-to-thumb vector to the ground plane, and use that vector to convert torque back to force, and add it to the z-output-force. This force value is transmitted over the serial link to the Teensy microcontroller.

In the Teensy, the force is mapped to a voice coil signal. We use the data from the first user study, below, to construct the mapping from amplitude to virtual force. The amplitude of the signal is capped so that forces larger than can be expressed by the voice coil are expressed by the maximum perceived force.

For evaluation studies, details and performance results the reader is directed to U.S. Provisional Patent Application 62/571,745 filed Oct. 12, 2017, which is incorporated herein by reference.

What is claimed is:

1. A device to simulate kinesthetic pad opposition grip forces and weight for grasping virtual objects in a virtual reality, comprising:
   (a) a base, wherein the base has a thumb pad;
   (b) a sliding part connected with the base through a first prismatic joint, wherein the sliding part has a finger pad, wherein the prismatic joint allows for single degree of freedom pinching motions between the thumb pad and the finger pad for grasping an object,
   (c) a brake mechanism on the sliding part as a first actuator, wherein the brake mechanism is used to create a grasping force; and
   (c) a swinging part connected to the sliding part and the base through revolute joints, wherein the swinging part comprises two linear resonant actuators as second actuators connected through a second prismatic joint, wherein one linear resonant actuator is placed closely to the finger pad and the other linear resonant actuator is placed closely to the thumb pad for transmission of vibration signals, and wherein the linear resonant actuators provide both touch sensation at initial contact and sensation of weight when lifting the object.

2. The device as set forth in claim 1, wherein the base has retroreflective markers to be captured by an external optical motion capture system for tracking the thumb's position and orientation.

3. The device as set forth in claim 1, wherein the first and the second prismatic joints are made of carbon fiber tubes.

4. The device as set forth in claim 1, wherein the finger pad is an index finger pad.

5. The device as set forth in claim 1, wherein the brake mechanism contains a brake lever, a tendon, and a motor.

6. The device as set forth in claim 1, wherein an offset distance between the revolute joint and center of mass of the swinging part ensures that the direction of the linear resonant actuators is always passively directed to be normal to ground.

7. The device as set forth in claim 1, wherein linear resonant actuators are voice coil actuators.

8. The device as set forth in claim 1, wherein the second prismatic joint on the swinging part constrains two angles of linear resonant actuators to be the same while allowing them to slide relative to one another.

* * * * *